(12) United States Patent
Batra et al.

(10) Patent No.: US 11,205,178 B2
(45) Date of Patent: Dec. 21, 2021

(54) CONVERTING PROCESSES INTO MULTIPLE BLOCKCHAIN SMART CONTRACTS

(71) Applicant: International Business Machines Corporation, Armonk, NY (US)

(72) Inventors: Vishal S. Batra, Noida (IN); Praveen Jayachandran, Bangalore (IN); Shachi Sharma, New Delhi (IN); Abhishek Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/856,138

(22) Filed: Dec. 28, 2017

(65) Prior Publication Data

US 2019/0205884 A1 Jul. 4, 2019

(51) Int. Cl.
| | |
|---|---|
| *G06Q 20/40* | (2012.01) |
| *G06Q 30/02* | (2012.01) |
| *G06Q 20/32* | (2012.01) |
| *G06Q 20/34* | (2012.01) |
| *G06Q 20/38* | (2012.01) |
| *G06Q 10/06* | (2012.01) |
| *G06Q 50/18* | (2012.01) |

(52) U.S. Cl.
CPC ..... *G06Q 20/4014* (2013.01); *G06Q 10/0633* (2013.01); *G06Q 20/3827* (2013.01); *G06Q 20/405* (2013.01); *G06Q 50/18* (2013.01); *G06Q 2220/00* (2013.01)

(58) Field of Classification Search
CPC ..... G06Q 20/00–425; G06Q 10/00–30; G06Q 50/00–34; G06Q 2220/00–18
See application file for complete search history.

(56) References Cited

U.S. PATENT DOCUMENTS

| | | | |
|---|---|---|---|
| 6,918,092 B2* | 7/2005 | Talley | G06F 3/0481 |
| | | | 715/761 |
| 7,350,237 B2* | 3/2008 | Vogel | G06F 21/6227 |
| | | | 726/27 |
| 10,158,479 B2* | 12/2018 | Chapman | G06F 40/103 |
| 2015/0206106 A1 | 7/2015 | Yago | |
| 2015/0379510 A1 | 12/2015 | Smith | |
| 2016/0260171 A1 | 9/2016 | Ford et al. | |
| 2017/0011460 A1 | 1/2017 | Molinari et al. | |
| 2017/0046689 A1 | 2/2017 | Lohe et al. | |

(Continued)

FOREIGN PATENT DOCUMENTS

WO   2017098519 A1   6/2017

OTHER PUBLICATIONS

Ron White, How Computers Work, 2003, Que, 7th Ed. (Year: 2003) (Year: 2003).*

(Continued)

*Primary Examiner* — John W Hayes
*Assistant Examiner* — Chenyuh Kuo

(57) ABSTRACT

An example operation may include one or more of identifying a workflow specification including a number of entities and state elements, selecting two or more entities designated as a subset of entities among the entities, where the subset of entities share one or more of the state elements of the workflow specification among the state elements, and creating a first smart contract identifying the one or more state elements.

14 Claims, 9 Drawing Sheets

(56) References Cited

U.S. PATENT DOCUMENTS

| | | | |
|---|---|---|---|
| 2017/0140408 A1 | 5/2017 | Wuehler | |
| 2017/0287068 A1* | 10/2017 | Nugent | G06Q 20/065 |
| 2018/0075527 A1* | 3/2018 | Nagla | G06Q 40/025 |
| 2018/0096313 A1* | 4/2018 | Chenard | G06Q 20/389 |
| 2018/0288022 A1* | 10/2018 | Madisetti | H04L 9/14 |
| 2019/0220813 A1* | 7/2019 | Madisetti | G06F 16/1865 |

OTHER PUBLICATIONS

Bhargavan et al., "Short Paper: Formal Verification of Smart Contracts", www.cs.umd.edu, 2010 (p. 1, col. 1, paras 1-2). https://www.cs.umd.edu/~aseem/solidetherplas.pdf.

* cited by examiner

CONVERTING PROCESSES INTO MULTIPLE BLOCKCHAIN SMART CONTRACTS

TECHNICAL FIELD

This application generally relates to managing smart contracts in a blockchain, and more particularly, to converting processes into multiple blockchain smart contracts.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify any information. Because a blockchain is a distributed system, before adding a transaction to the blockchain ledger, all peers need to reach a consensus status.

Enterprise workflows involve an end-to-end complex workflow for a particular industry including a process state and permission/access control to alter the process state and execute the process to advance the workflow as a few examples of items included in a workflow. In a workflow involving multiple organizations, there is no single system or entity that can manage and control the entire workflow processes, end-to-end, in general. A complex industrial process involves multiple entities. For instance, a process in the manufacturing industry includes multiple suppliers and transport logistics companies, assembly/manufacturing companies, assembly unit industries, distribution channel partners, etc. In trade, this may include exporters, importers, freight forwarders, supporting institutions, logistics companies, ports, customs, and government authorities. While processes may capture the end-to-end overall process, all the parties do not necessarily have to interface/transact with all other parties. In general, parties transact with only a subset of other parties in a complex process of which they immediately depend on in the large complex process realm. The rights and obligations of parties, therefore, are confined to only a subset of parties they transact with at all times. All the parties involved in the process, therefore, are not part of a single large legal contract and as a result there is room for segregation within those workflows.

SUMMARY

One example embodiment may provide a method that includes one or more of identifying a workflow specification comprising a plurality of entities and a plurality of state elements, selecting two or more entities designated as a subset of entities among the plurality of entities, and the subset of entities share one or more of the state elements of the workflow specification among the plurality of state elements, and creating a first smart contract identifying the one or more state elements.

Another example embodiment may include an apparatus that includes a processor configured to perform one or more of identify a workflow specification comprising a plurality of entities and a plurality of state elements, select two or more entities designated as a subset of entities among the plurality of entities, wherein the subset of entities share one or more of the state elements of the workflow specification among the plurality of state elements, and create a first smart contract identifying the one or more state elements.

Yet another example embodiment may provide a non-transitory computer readable storage medium that stores instructions which when executed causes a processor to perform one or more of identifying a workflow specification comprising a plurality of entities and a plurality of state elements, selecting two or more entities designated as a subset of entities among the plurality of entities, and the subset of entities share one or more of the state elements of the workflow specification among the plurality of state elements, and creating a first smart contract identifying the one or more state elements.

DETAILED DESCRIPTION

Figure 1A:
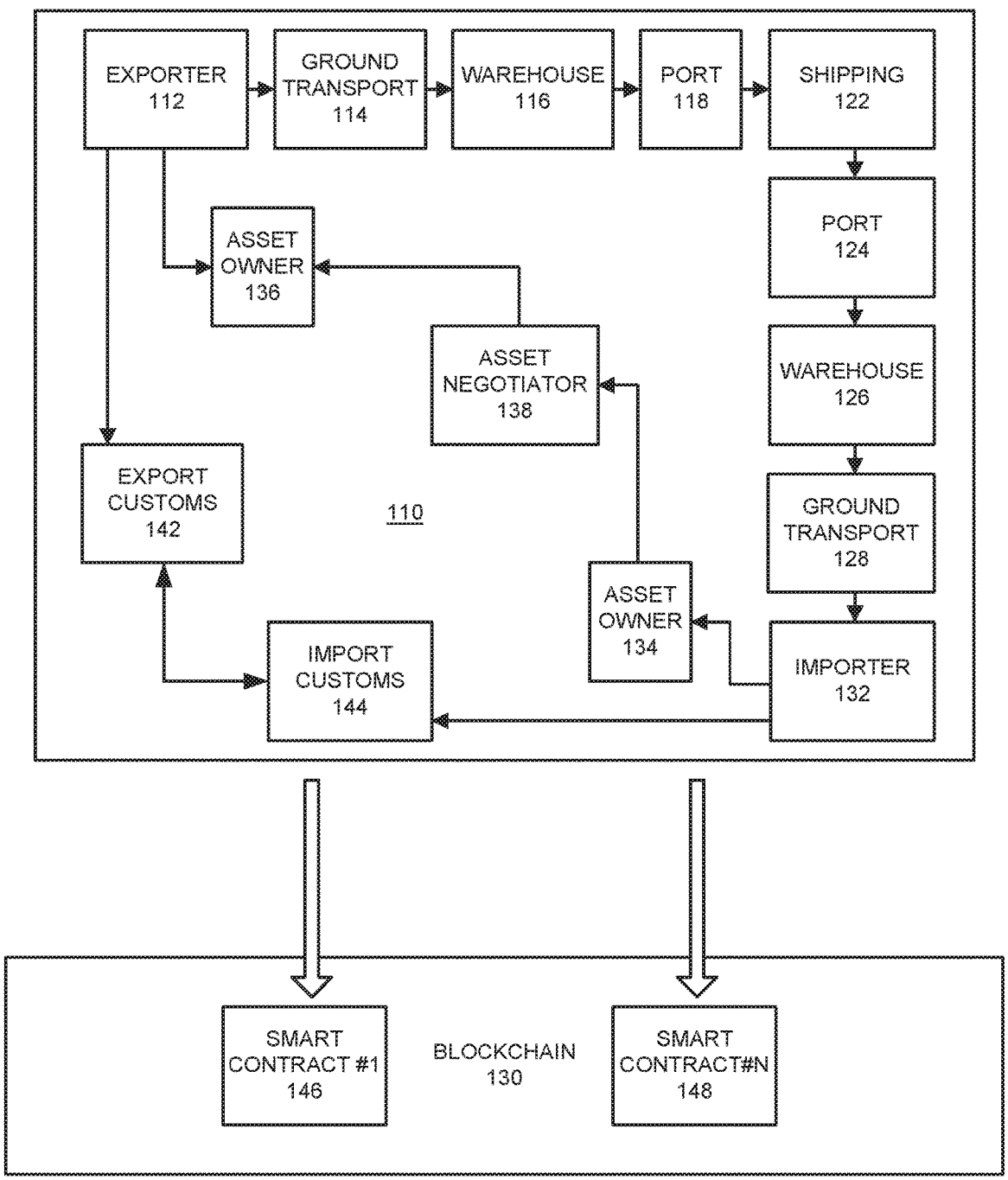
FIG. 1A illustrates a logic diagram of workflow process and supply chain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to managing smart contracts in a blockchain, and in another embodiment relates to identifying characteristics/attributes of a workflow process to create multiple blockchain smart contracts.

Example embodiments provide for evaluating complex multi-party workflow processes which cannot be implemented/executed through a single smart contract on a blockchain. The workflow process is identified, analyzed and used to automatically generate multiple interacting smart contracts on the blockchain. For a given (complex) workflow process specification, subsets of parties transacting together may be identified and consolidated as sub-parts of the business process where the changing set of transacting parties may be identified as sub-workflow or sub-contract boundaries for those parties.

As referred to herein, a blockchain is a distributed system consisting of multiple nodes that communicate with each other. The blockchain runs programs called chaincode (e.g., smart contracts, etc.), holds state and ledger data, and executes transactions. Transactions are operations invoked on the chaincode. Transactions typically must be "endorsed" and only endorsed transactions may be committed and have an effect on the state of the blockchain system. There may exist one or more special chaincodes for management functions and parameters, collectively called system chaincodes.

Nodes are the communication entities of the blockchain system. A "node" is a logical function in the sense that multiple nodes of different types can run on the same physical server. Nodes are grouped in trust domains and associated to logical entities that control them in various ways. Nodes may include different types such as a client or submitting-client node which submits a transaction-invocation to an endorser (e.g., peer), and broadcasts transaction-proposals to an ordering service (e.g., ordering node). Another type of node is a peer node which receives client submitted transactions, commits the transactions and maintains the state and a copy of the ledger. Peers can also have the role of an endorser, although it is not a requirement. The ordering-service-node or orderer is a node running the communication service for all nodes and which implements a delivery guarantee, such as atomic or total order broadcast to each of the peer nodes in the system when committing transactions and modifying the world state.

The ledger is a sequenced, tamper-resistant record of all state transitions of the blockchain. State transitions are a result of chaincode invocations (i.e., transactions) submitted by participating parties (e.g., client nodes, ordering nodes, endorser nodes, peer nodes, etc.) A transaction may result in a set of asset key-value pairs that are committed to the ledger as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

The chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added block represents every transaction on the chain that has come before it, making it possible to ensure that all peer nodes are in a consistent and trusted state. The chain may be stored on the peer node file system (either local or attached storage), efficiently supporting the append-only nature of the blockchain workload.

The current state of the immutable ledger represents the latest values for all keys that are included in the chain transaction log. Because the current state represents the latest key values known to the channel, it is sometimes referred to as a world state. Chaincode invocations execute transactions against the current state data of the ledger. To make these chaincode interactions efficient, the latest values of the keys may be stored in the state database. The state database may be simply an indexed view into the chain's transaction log, it can therefore be regenerated from the chain at any time. The state database may automatically get recovered (or generated if needed) upon peer node startup, and before transactions are accepted.

FIG. 1A illustrates a logic diagram of workflow process and supply chain 100, according to example embodiments. Referring to FIG. 1A, the workflow 110 provides a circular flow of entities transacting during a product sale/trade workflow. For example, an exporter 112, may seek ground transportation 114, which requires a warehouse 116 and operates alongside a port 118, where a shipping line 122 provides cargo. A port 124 may be used for the importer 132 as well, along with a warehouse 126, ground transportation 128. The asset backers or owners 134/136 may rely on an asset negotiator 138 to regulate the assets securities or other transactions associated with the products in the workflow cycle. Other parties may include export customs 142 and import customs 144, which may require papers and other information to satisfy government rules and regulations. Any of the entities in FIG. 1A may require information or data from any other entities at any given time. However, many of the entities may not require information and may be considered irrelevant to one or more of the transacting parties. The information shared may be sensitive, public and/or somewhere in-between, such as protected but not private or public.

As subsets of the larger workflow cycle are identified to include one or more entities, one or more events or state elements (i.e., purchase, delivery, sale, departure, stocking, etc.), and are then considered for creating a new smart contract. In FIG. 1A, the blockchain may include a processing platform, such as a virtual machine that can identify and process the workflow data and determine whether certain criteria are met to satisfy a smart contract creation cycle. A smart contract may be created based on a smart contract construct and/or template. The smart contracts may be created one at a time 146 and may include any number "N" of smart contracts 148. The smart contracts may be stored in the blockchain 130 and referenced when needed during the workflow process.

Possible smart contracts may be created, for example, between an importer and exporter of goods and based on a contract, a purchase order and an invoice. Another example may include an importer and asset owner including an account, a loan and/or a negotiation of an instrument. Also, asset owners may trade instruments and require certain documents in the process of offering, accepting, negotiating, etc. Other potential smart contracts may be formed based on transport entities, customs authorities and other parties to the workflow process. A same smart contract template may be invoked for certain repetitious actions conducted during the workflow process.

In the workflow, certain state elements, access control and workflow instances may be identified as part of the workflow which may require a separate contract for preserving party anonymity/security procedures among other considerations. One approach may include identifying parts of the process workflow where the state elements change, and identifying parts of the process workflow where access control rules change. Next, multiple smart contracts may be generated for each sub-process for every subset of parties identified, along with the state elements for each smart contract, a declarative specification of the sub-process may be created and separate into smart contract code which may be template-based, and where only configurations are provided to an existing contract template. A share status may be created among various generated smart contracts and enforced for the process workflow via a smart contract events and subscription framework.

The example process encodes state 'status' and a portion of the workflow process that manages that state, which enforces access control rules and defines the interfaces between interacting smart contracts. For example, a smart contract may be configured to have a published 'private', 'protected' and/or 'public' event(s). Private events can only be subscribed by the event generating smart contract, public events can be subscribed by other smart contracts having (one or more) common parties and protected events can be subscribed by any smart contract on the network. Smart contract programs may subscribe to events generated by other smart contracts running on the blockchain. This enables an event-subscription based collaboration and orchestration among smart contracts and enables inter-smart contract workflow execution that permits an end-to-end workflow to occur as a set of interacting smart contracts with the necessary access controls.

In one trade example, a private event may occur when documents are submitted by an exporter's asset manager and approved by the importer's asset manager, and this event can trigger automatic transfer of funds. An example protected event in a freight forwarder-shipping line contract may occur when a bill of lading is generated, which can trigger a submission of customs declaration and other documents in the freight forwarder-customs smart contract. For a shipping line entity, a port contract can release public events regarding a real-time schedule of ships that exporters, importers and freight forwarders may be permitted to subscribe.

Figure 1B:
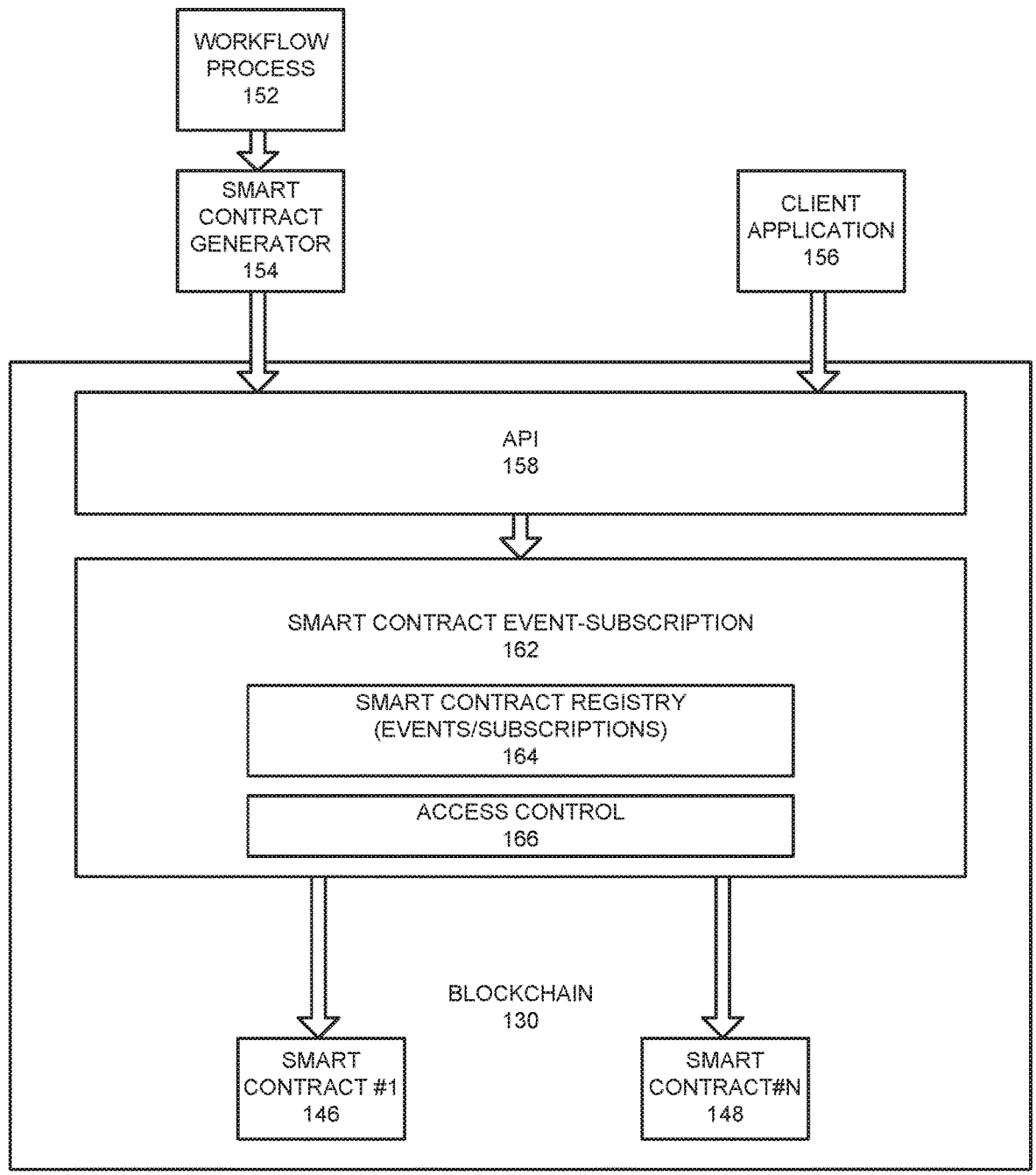
FIG. 1B illustrates a logic diagram of a blockchain smart contract creation procedure, according to example embodiments.

FIG. 1B illustrates a logic diagram of a blockchain smart contract creation procedure, according to example embodiments. Referring to FIG. 1B, the example configuration 150 may include a workflow process 152 as a data file, files, or other data format which is obtainable and which may be accessed and processed by a smart contract generate 154 to create one or more smart contracts via an API 158, which may also be managed by a client application 156. A smart contract event subscription module 162 may provide a processing module which provide smart contract registry 164 which includes all active subscriptions and events which are known. The access control sub-module 166 may provide a portal to access the one or more smart contracts 146/148 stored in the blockchain 130.

Figure 1C:
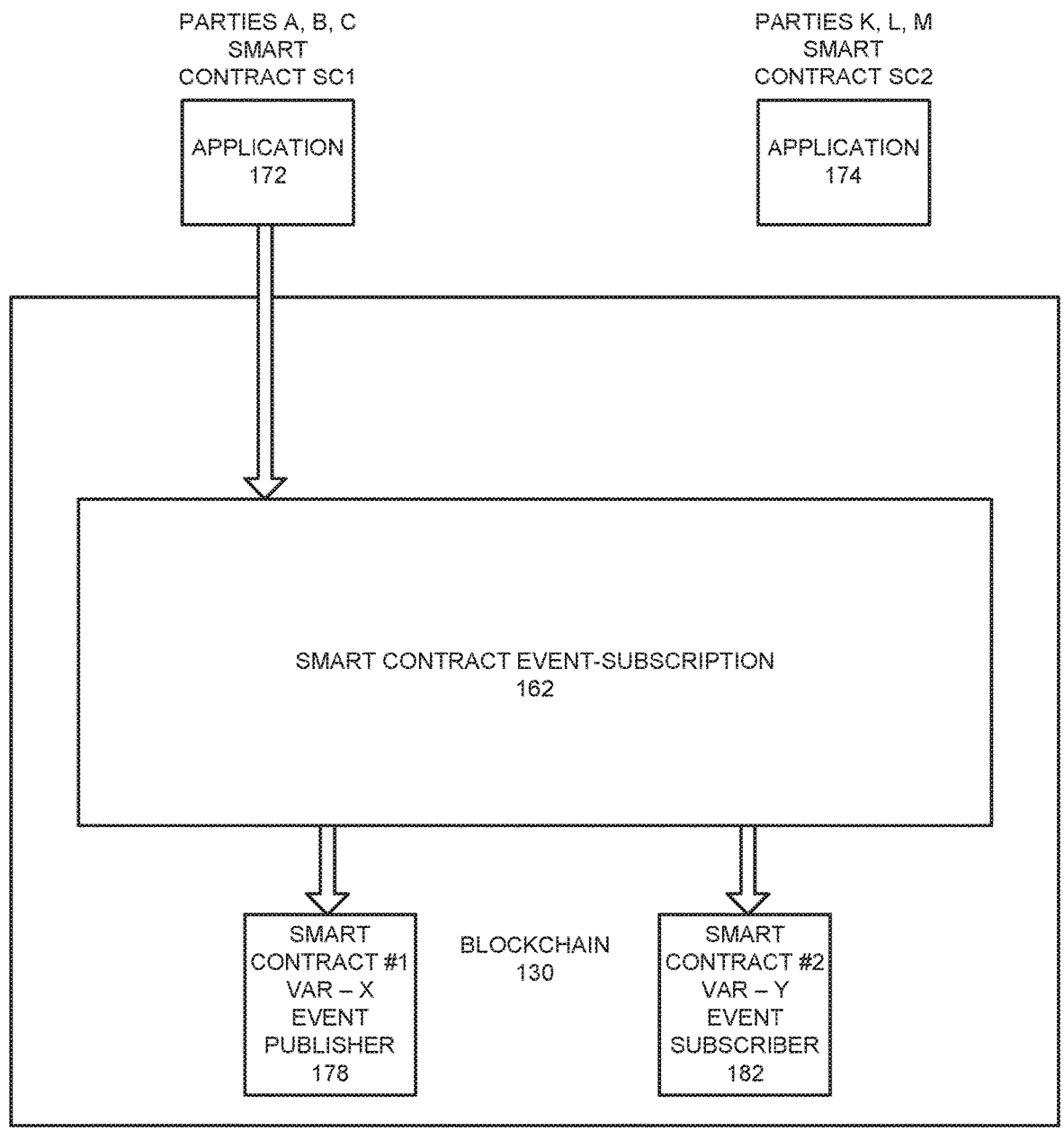
FIG. 1C illustrates a logic diagram of a blockchain smart contract event subscription module, according to example embodiments.

FIG. 1C illustrates a logic diagram of a blockchain smart contract event subscription module, according to example embodiments. Referring to FIG. 1C, the process 170 may include one or more applications 172/174 utilizing one or more smart contracts. In this example, there are two smart contracts, however, there may be any number of smart contracts which are generated from one or more workflows. The first smart contract SC1 may have three entities or parties A, B and C and the second smart contract may have three different entities or parties K, L and M. In operation the smart contract event-subscription engine 162 may be used to generate, update and/or modify the smart contracts. SC1 may declare a public event on record 'X' of its smart contract, and SC2 182 may subscribe to SC1's public event on record X. For instance, user 'B' of SC1 178 updates X and event management framework contains a smart contract registry. The event-subscription engine 162 may intercept the request to update record X, and also detect a public event defined on record X of SC1 and SC2, which are subscribed to that event. The event-subscription engine notifies SC2, and SC2 has a (special) function (notify event) to process events notified by the event-subscription engine. The function notify-event is not visible to applications outside of the blockchain.

The workflow specification is captured in a specification file format, such as JSON or XML or any other type. The smart contracts are identified from the input workflow specification. The smart contracts are the output generated by the application and can be deployed on a blockchain node. In one example, if A interacts with B only and B interacts with C only, then two smart contracts will be formed: SC1 for A and B, and SC2 for B and C. When A interacts with B only and B interacts with C only, this implies that in the workflow specification, A may be listed to start the workflow process by updating a state variable X, followed by B updating state variable Y and C updating state variable Z, and A and C have no permission to access/update Z and X respectively, while B has access to both X and Z. In such a case, A and B, and B and C, can be sub-grouped to manage workflow state X, Y and Z with two smart contracts SC1 for A and B, and SC2 for B and C. SC1 will have state variables X and Y, while SC2 will have Y and Z. Since Y is common between the two smart contracts, a protected event can be identified between SC1 and SC2 so that when Y is updated in any contract, it notifies the other contract to update the value of Y.

One example embodiment may include a system, device and/or method that receives as input a complex workflow process specified in a machine readable form to include a declarative language, state machine, or other business process specification, and process it into multiple interacting smart contracts, where each smart contract works with a subset of the identified entities. Each smart contract works with a subset of the global state and each smart contract enforces access rules for the subset of entities on the subset of the global state. Each smart contract defines the interfaces to other smart contracts. Smart contract events and subscription engine 162 provides a way to define private, protected and/or public events to enable the interaction with other smart contracts in the process. One approach is to retrieve and enforce engagement terms and rules as agreed upon by the collaborating parties. The engagement rules include rights and obligations of the parties within the smart contract. Also, the smart contract program is jointly owned, deployed and enforced by the collaborating parties. There is no central party to deploy and run/enforce the smart contract, and thus the smart contract is legally enforceable.

Figure 2A:
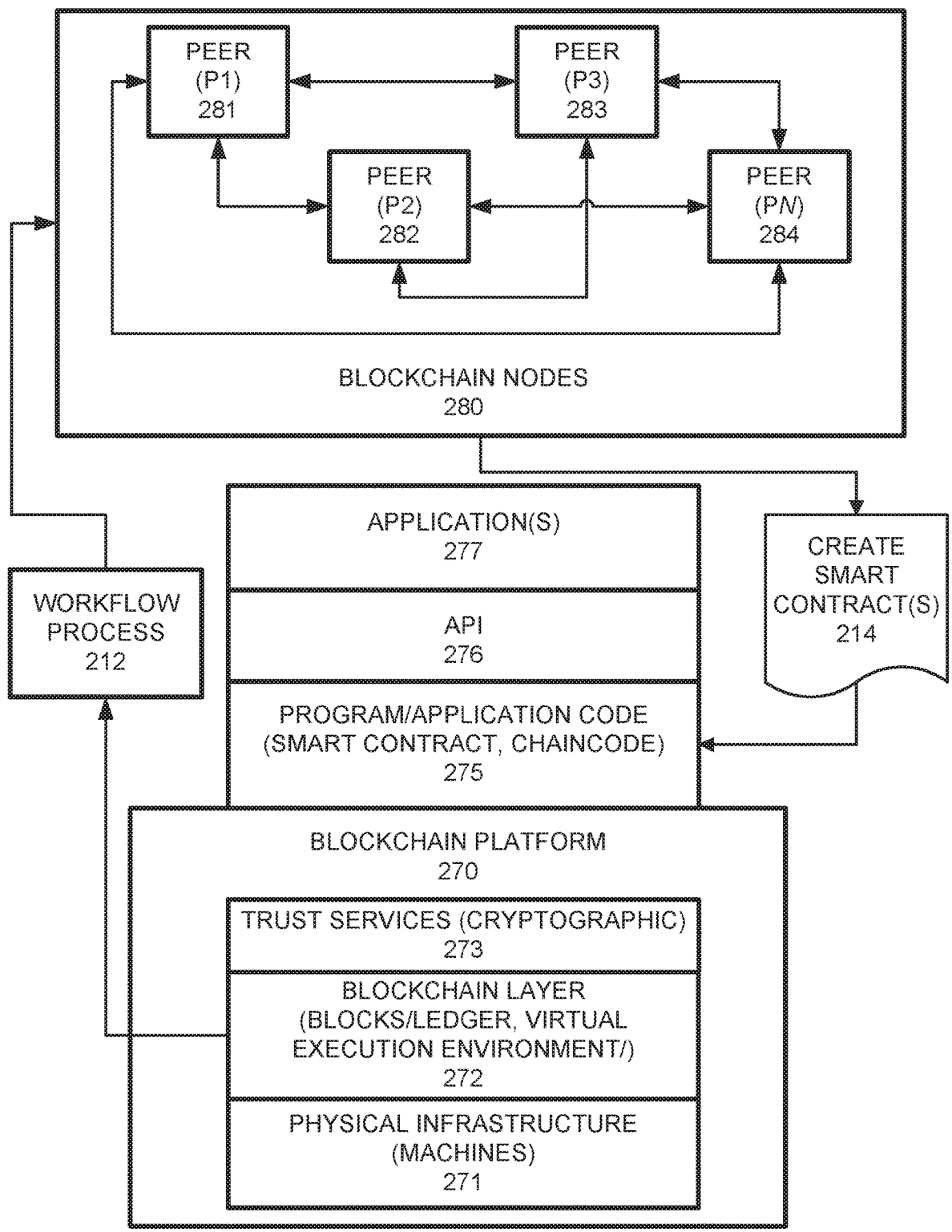
FIG. 2A illustrates an example blockchain configuration for performing a smart contract creation cycle, according to example embodiments.

FIG. 2A illustrates an example blockchain configuration for performing smart contract creation on a blockchain, according to example embodiments. Referring to FIG. 2A, the blockchain system 200A may include certain common blockchain elements, such as a group of blockchain nodes 280, which may be assigned peer blockchain nodes 'peer nodes' 281-284, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2A may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a workflow process may be received/retrieved 212, which may be identified by the peer nodes 280. The nodes may identify a need to create new smart contracts 214. The process may also be automated by a blockchain computing platform that operates independently of the blockchain nodes 280. Also, a smart contract creation process 214 may be performed based on the received workflow.

Figure 2B:
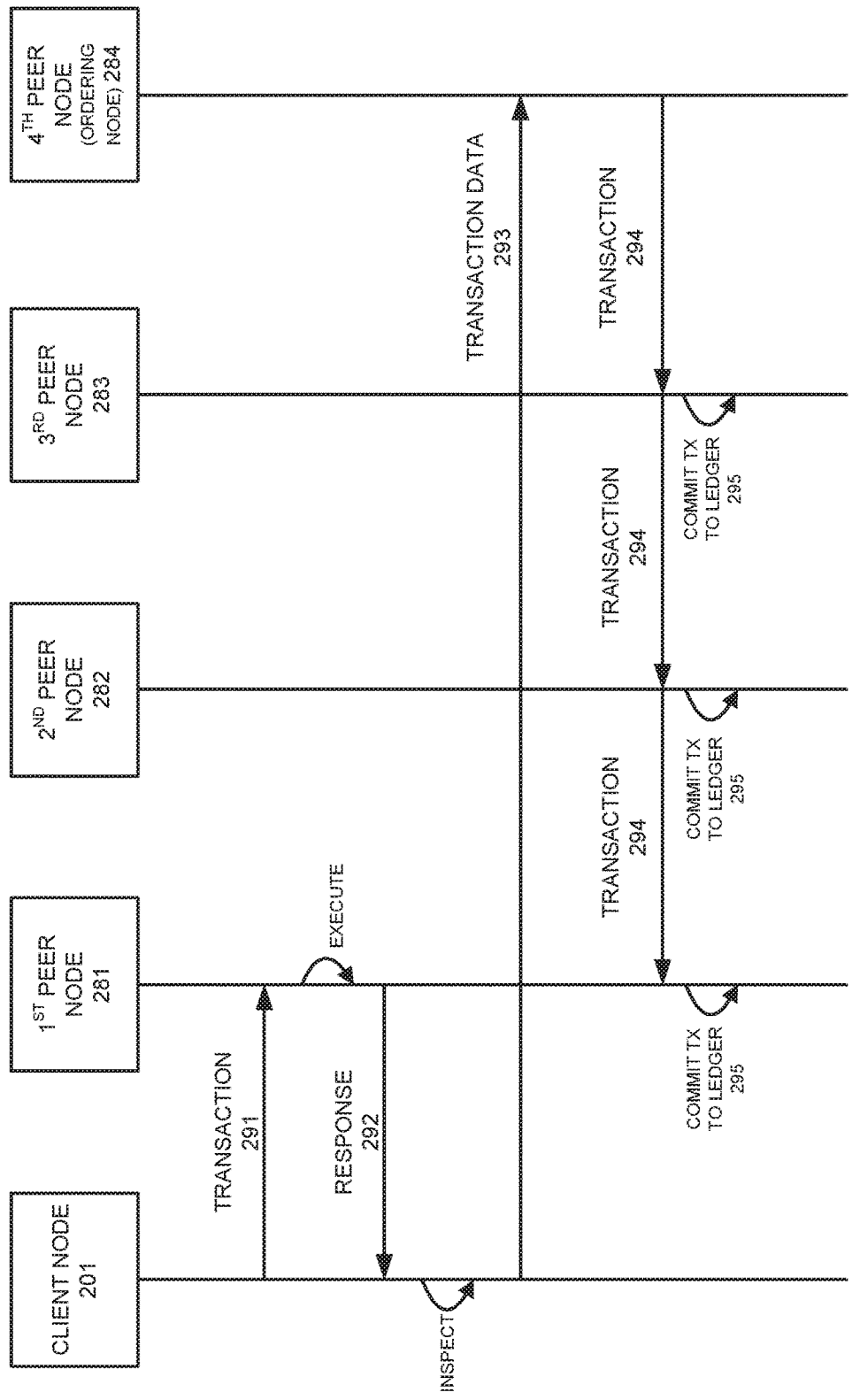
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal sent by an application client node 201 to an endorsing peer node 281.

The endorsing peer 281 may verify the client signature, and execute a chaincode function to simulate the transaction. The output is the chaincode results, a set of key/value versions that were read in the chaincode (read set), and the set of keys/values that were written in chaincode (write set). The proposal response gets sent back to the client 201 along with an endorsement signature. The client assembles the endorsements into a transaction payload and broadcasts it to an ordering service node 284. The ordering service node 284 then delivers ordered transactions as blocks to all peers 281-283 on a channel. Before committal, each peer 281-283 may validate the transactions. For example, they may check the endorsement policy to ensure that the correct allotment of the specified peers have signed the results, and authenticate the signatures against the transaction payload.

Referring to FIG. 2B, in step 291 the client node 201 initiates the transaction by constructing and sending a request to the peer node 281 which is an endorser. The client 201 may include an application leveraging a supported software development kit (SDK) such as Node, Java, Python, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over gRPC) and take the client's cryptographic credentials to produce a unique signature for this transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In step 292, the set of these values, along with the endorsing peer node's 281 signature is passed back as a proposal response to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering service 284. If the client application intends to submit the transaction to ordering service 284 to update the ledger, the application determines if the specified endorsement policy has been fulfilled before submitting (i.e., did peer nodes necessary for the transaction both endorse). Here, the client may include only one of multiple parties to the transaction. In this case, each client may have their own endorsing node, and each endorsing node will need to endorse the transaction. The architecture is such that even if an application chooses not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation; it may simply receive transactions from all channels in the network, order them chronologically by channel, and create blocks of transactions per channel.

In step 294, the blocks of the transaction are delivered from the ordering node 284 to all peer nodes 281-283 on the channel. The transactions within the block are validated to ensure endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as notification of whether the transaction was validated or invalidated.

Figure 3:
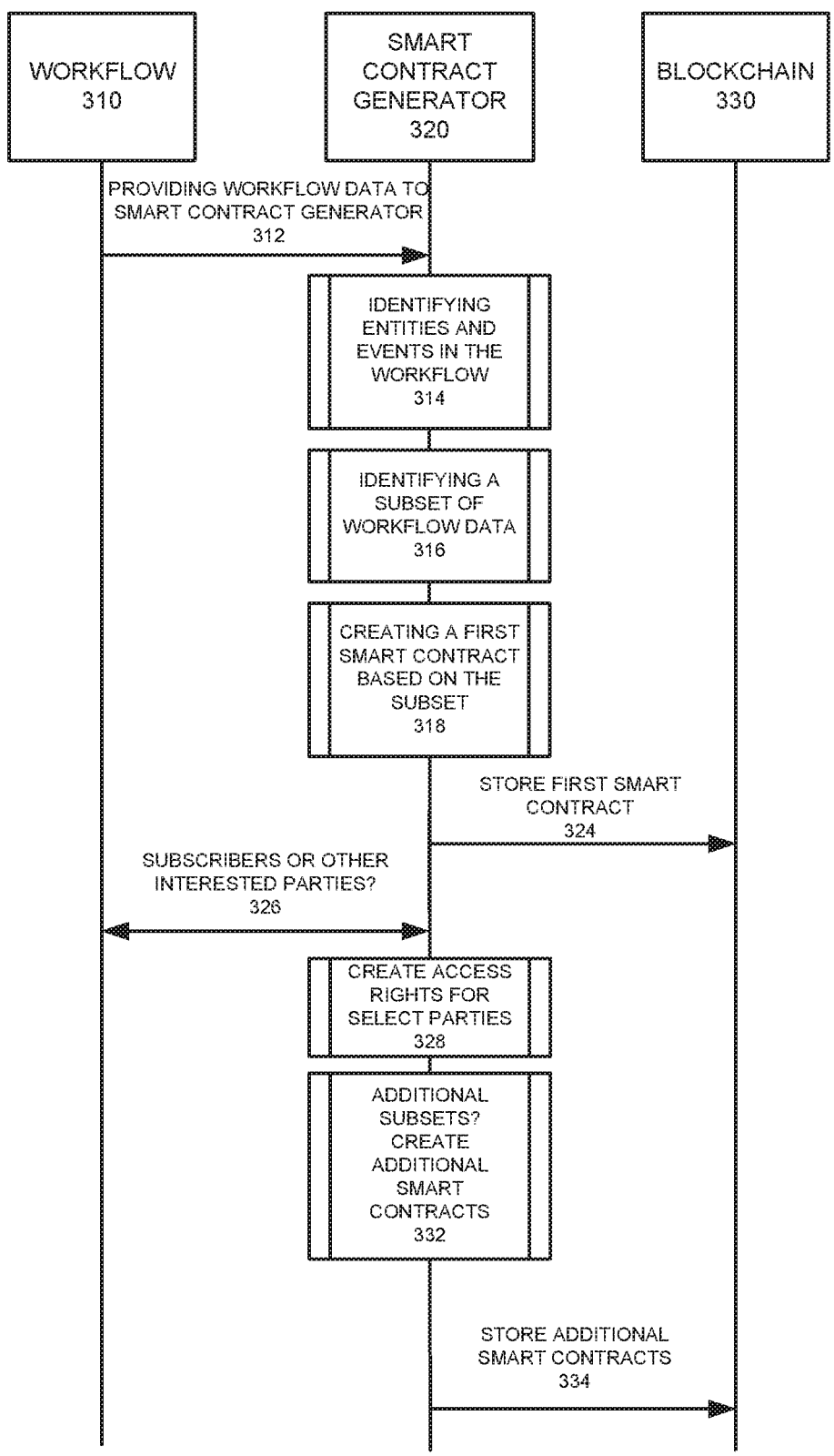
FIG. 3 illustrates a system messaging diagram for managing a smart contract creation procedure, according to example embodiments.

FIG. 3 illustrates a system messaging diagram for managing a smart contract creation procedure, according to example embodiments. Referring to FIG. 3, the example configuration 300 includes a workflow specification 310 which is retrieved and forwarded 312 to a smart contract generator 320, which performs identifying entities and events in the workflow 314, identifying a subset of workflow data 316 and using that data to create a smart contract 318, as a first smart contract which is then stored 324 in the blockchain 330. The smart contract generator may determine whether there are subscribers or other interested parties 326 and whether to create access rights for the select parties 328. Any additional subsets can be identified for additional smart contract creation 332 which is also stored 334 in the blockchain 300 once created.

Figure 4A:
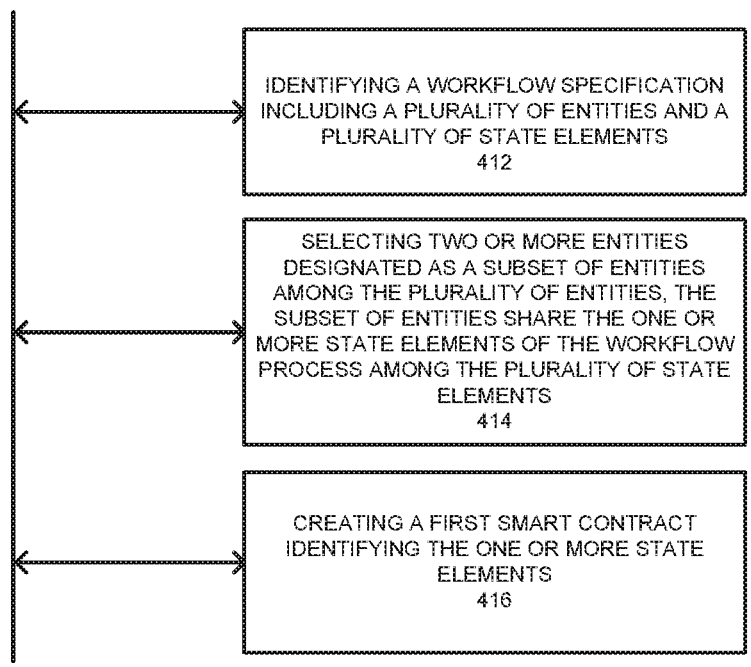
FIG. 4A illustrates a flow diagram of an example method of managing smart contract creation on a blockchain, according to example embodiments.

FIG. 4A illustrates a flow diagram of an example method of managing smart contract creation on a blockchain, according to example embodiments. Referring to FIG. 4A, the method 400 may include identifying a workflow specification including a plurality of entities and a plurality of state elements 412, selecting two or more entities designated as a subset of entities among the plurality of entities, wherein the subset of entities share one or more of the state elements of the workflow specification among the plurality of state elements 414, creating a first smart contract identifying the one or more state elements 416.

The method may also include creating a second smart contract subscribed to the one or more state elements identified in the first smart contract, and identifying state elements for each smart contract identified among the one or more smart contracts. The workflow specification is stored in one or more committed blockchain transactions. The method may also include determining whether any of the plurality of state elements are a private event, a protected event and a public event, and invoking different smart contract rules when subscribing the second smart contract to one or more of the private event, the protected event and the public event. The method may also include selecting a smart contract template among a plurality of smart contract templates, populating the smart contract template with the one or more state elements, and designating the smart contract template as the first smart contract. The method may also include determining one or more additional entities among the plurality of entities which are related to the one or more state elements, and selecting the one or more additional entities to have access to the first smart contract. The access includes one of partial access and full access.

Figure 4B:
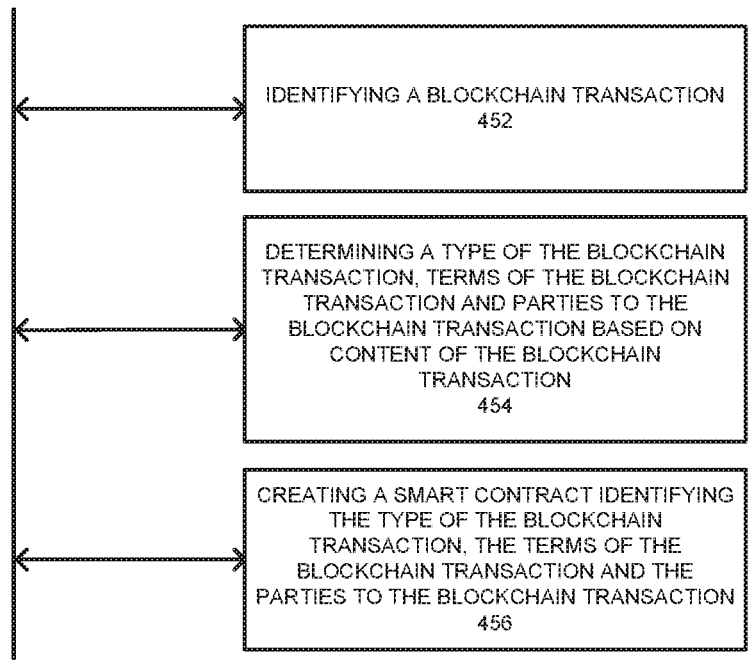
FIG. 4B illustrates a flow diagram of another example method of managing smart contract creation on a blockchain, according to example embodiments.

FIG. 4B illustrates a flow diagram of another example method of managing smart contract creation on a blockchain, according to example embodiments. Referring to FIG. 4B, the method 450 may include identifying a blockchain transaction 452, determining a type of the blockchain transaction, terms of the blockchain transaction and parties to the blockchain transaction based on content of the blockchain transaction 454, and creating a smart contract identifying the type of the blockchain transaction, the terms of the blockchain transaction and the parties to the blockchain transaction 456.

In this alternative embodiment, instead of relying on the workflow data to identify smart contract potential in general, the blockchain transactions can be identified along with requests for transactions conducted prior to blockchain transactions. The information identified may include the parties, the type of transaction, such as purchases, services, products, etc., and terms, which may include agreements made by the parties. The information can be used to create a smart contract on-the-fly, which is used to conduct the current request for a transaction along with future transactions. The smart contract can be stored in the blockchain and referenced based on user profiles or similar transaction information.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
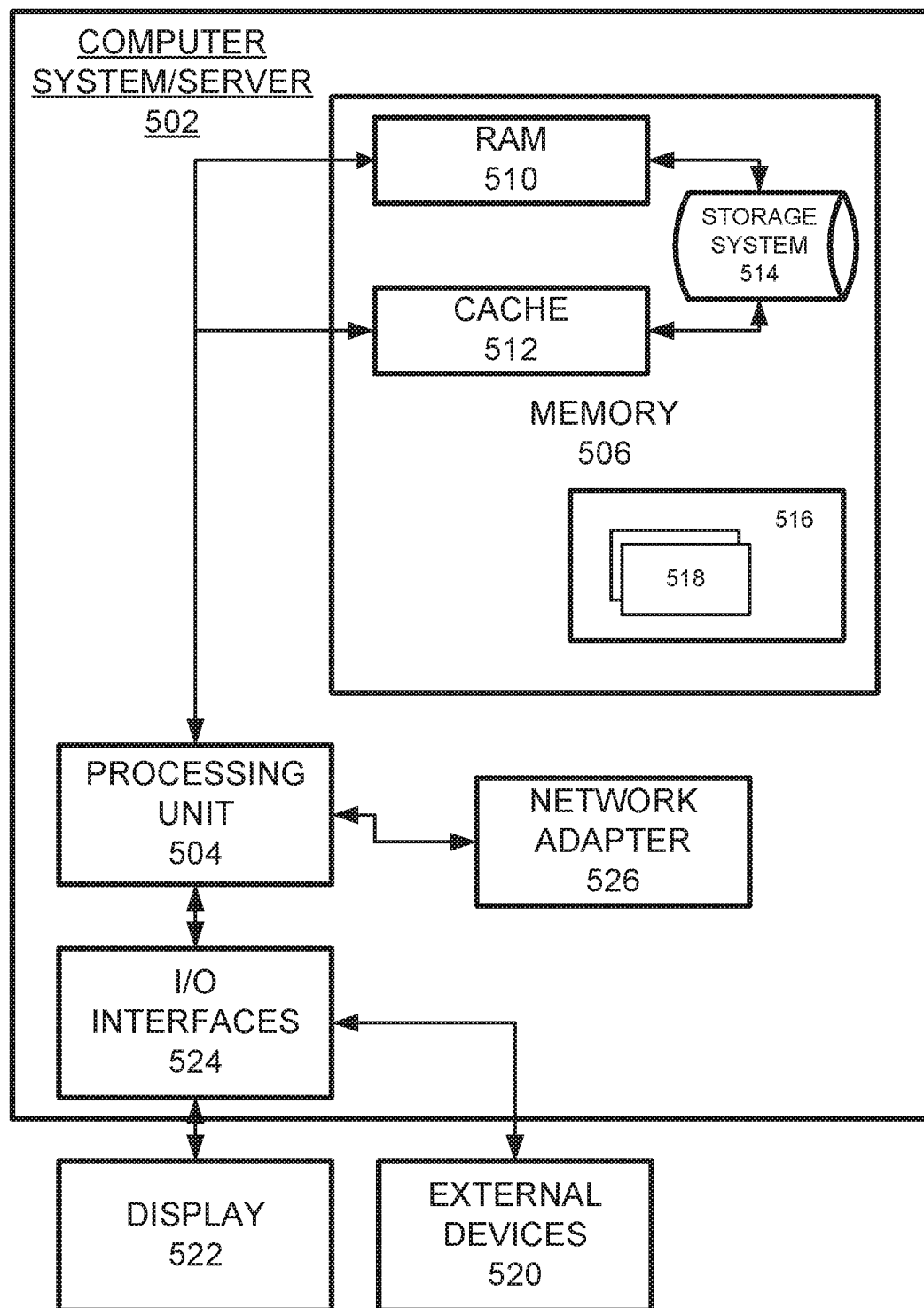
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
receiving, by a processor, a machine-readable workflow specification including a plurality of entities and a plurality of state elements;
based on the received machine-readable workflow specification, identifying, by the processor, for a first sub-process, a first entity and a second entity of the plurality of the entities, a first state variable and a second state variable of the plurality of the state elements, and a first access control data, wherein the first access control data comprises a write access of the first state variable and a read access of the second state variable for the first entity, and a read access of the first state variable and a write access of the second state variable for the second entity;
based on the received machine-readable workflow specification, identifying, by the processor, for a second sub-process, the second entity and a third entity of the plurality of the entities, the second state variable and a third state variable of the plurality of the state elements, and a second access control data, wherein the second access control data comprises the write access of the second state variable and a read access of the third state variable for the second entity, and a read access of the second state variable and a write access of the third state variable for the third entity;
based on the first and second sub-processes, automatically generating, by the processor, for the first sub-process, a first smart contract which comprises the first and second variables, the first and second entities, and a first access rule based on the first access control data, and, for the second sub-process, a second smart contract which comprises the second and third variables, the second and third entities, and a second access rule based on the second access control data, wherein the second smart contract further comprises a subscription to an event of the second state variable of the first contract;
storing, by the processor, in a smart contract registry, the event of the first smart contract and the subscription of the second smart contract;
deploying, by the processor, the first and second smart contracts on a blockchain node;
receiving, by the processor, a request from the second entity to update the second state variable of the first smart contract;
determining, by the processor that the second entity has the write access to the second variable of the first contract based on the first access rule;
in response to the determining, updating, by the processor, the second state variable of the first smart contract by executing the first smart contract;
detecting, by the processor, the event of the second state variable from the first smart contract;
generating, by the processor, a notification to the second smart contract based on the detected event of the second state variable of the first contract; and
updating, by the processor, the second state variable of the second smart contract by executing the second smart contract based on the second access rule.

2. The method of claim 1, wherein the generating comprises generating the first smart contract based on a smart contract template.

3. The method of claim 2, wherein the generating comprises populating the smart contract template with respective state elements of the machine-readable workflow to generate the first smart contract.

4. The method of claim 1, further comprising storing the first and second smart contracts on a blockchain.

5. The method of claim 1, wherein the generating comprises generating different access control rules for the first smart contract and the second smart contract.

6. An apparatus, comprising:
a processor configured to:

receive a machine-readable workflow specification including a plurality of entities and a plurality of state elements;

based on the received machine-readable workflow specification, identify, for a first sub-process, a first entity and a second entity of the plurality of the entities, a first state variable and a second state variable of the plurality of the state elements, and a first access control data, wherein the first access control data which comprises a write access of the first state variable and a read access of the second state variable for the first entity, and a read access of the first state variable and a write access of the second state variable for the second entity;

based on the received machine-readable workflow specification, identify, for a second sub-process, the second entity and a third entity of the plurality of the entities, the second state variable and a third state variable of the plurality of the state elements, and a second access control data, wherein the second access control data comprises the write access of the second state variable and a read access of the third state variable for the second entity, and a read access of the second state variable and a write access of the third state variable for the third entity;

based on the first and second sub-processes, automatically generate, for the first sub-process, a first smart contract-which comprises the first and second variables, the first and second entities, and a first access rule based on the first access control data, and, for the second sub-process, a second smart contract comprises the second and third variables, the second and third entities, and a second access rule based on the second access control data, wherein the second smart contract further comprises a subscription to an event of the second state variable of the first contract;

store, in a smart contract registry, the event of the first smart contract and the subscription of the second smart contract;

deploy the first and second smart contracts on a blockchain node;

receive a request from the second entity to update the second state variable of the first smart contract;

determinine that the second entity has the write access to the second variable of the first contract based on the first access rule;

in response to the determining, update the second state variable of the first smart contract by executing the first smart contract;

detect the event of the second state variable from the first smart contract;

generate a notification to the second smart contract based on the detected event of the second state variable of the first contract; and update the second state variable of the second smart contract by executing the second smart contract based on the second access rule.

7. The apparatus of claim 6, wherein the processor is configured to generate the first smart contract based on a smart contract template.

8. The apparatus of claim 7, wherein the processor is configured to populate the smart contract template with respective state elements of the machine readable workflow to generate the first smart contract.

9. The apparatus of claim 6, wherein the processor is further configured to store the first and second smart contracts on a blockchain.

10. The apparatus of claim 6, wherein the processor is further configured to generate different access control rules for the first smart contract and the second smart contract.

11. A non-transitory computer readable storage medium that stores instructions that, when executed by a processor, cause the processor to perform a method comprising:

receiving a machine-readable workflow specification including a plurality of entities and a plurality of state elements;

based on the received machine-readable workflow specification, identifying, for a first sub-process, a first entity and a second entity of the plurality of the entities, a first state variable and a second state variable of the plurality of the state elements, and a first access control data, wherein the first access control data which comprises a write access of the first state variable and a read access of the second state variable for the first entity, and a read access of the first state variable and a write access of the second state variable for the second entity;

based on the received machine-readable workflow specification, identifying for a second sub-process, the second entity and a third entity of the plurality of the entities, the second state variable and a third state variable of the plurality of the state elements, and a second access control data, wherein the second access control data comprises the write access of the second state variable and a read access of the third state variable for the second entity, and a read access of the second state variable and a write access of the third state variable for the third entity;

based on the first and second sub-processes, automatically generating, for the first sub-process, a first smart contract which comprises the first and second variables, the first and second entities, and a first access rule based on the first access control data, and, for the second sub-process, a second smart contract which comprises the second and third variables, the second and third entities, and a second access rule based on the second access control data, wherein the second smart contract further comprises a subscription to an event of the second state variable of the first contract;

storing in a smart contract registry, the event of the first smart contract and the subscription of the second smart contract;

deploying the first and second smart contracts on a blockchain node;

receiving a request from the second entity to update the second state variable of the first smart contract;

determining that the second entity has the write access to the second variable of the first contract based on the first access rule;

in response to the determining, updating the second state variable of the first smart contract by executing the first smart contract;

detecting the event of the second state variable from the first smart contract;

generating, by the processor, a notification to the second smart contract based on the detected event of the second state variable of the first contract; and updating, by the processor, the second state variable of the second smart contract by executing the second smart contract based on the second access rule.

12. The non-transitory computer readable storage medium of claim 11, wherein the generating comprises generating the first smart contract based on a smart contract template.

13. The non-transitory computer readable storage medium of claim 12, wherein the generating comprises populating the smart contract template with respective state elements of the machine-readable workflow to generate the first smart contract.

14. The non-transitory computer readable storage medium of claim 11, wherein the method further comprises storing the first and second smart contracts on a blockchain.

* * * * *